May 21, 1963 J. WIMBERLEY 3,090,159
TREE AND STALK GIRDLER
Filed March 2, 1962 3 Sheets-Sheet 1

INVENTOR.
JOHN WIMBERLEY,
BY
McMorrow, Berman & Davidson
ATTORNEYS

May 21, 1963
J. WIMBERLEY
3,090,159
TREE AND STALK GIRDLER
Filed March 2, 1962
3 Sheets-Sheet 2
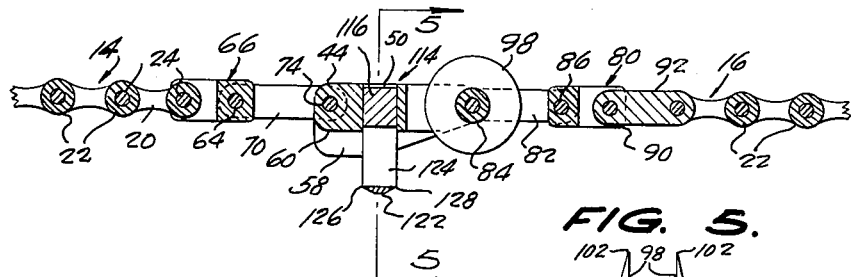
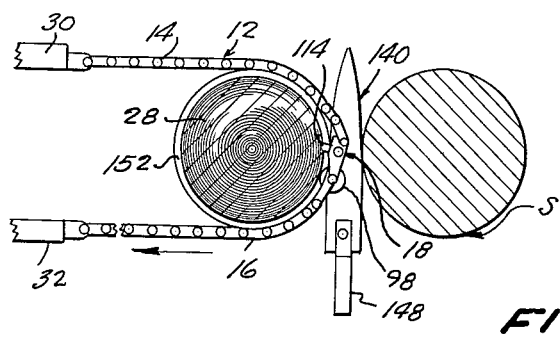
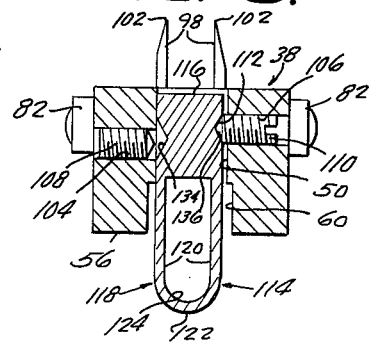
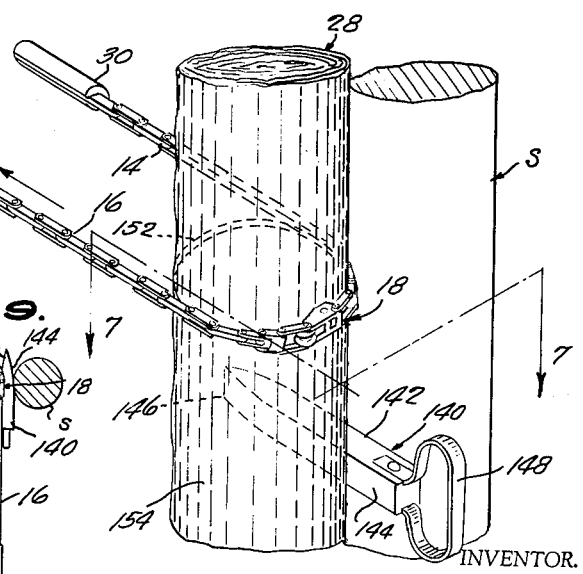
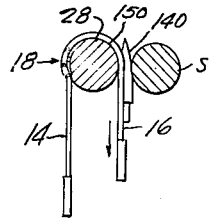
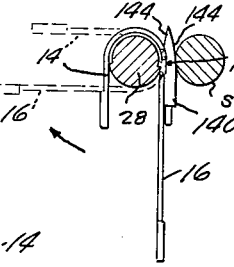
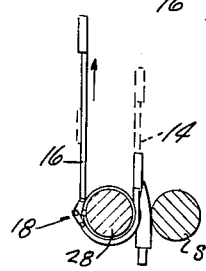
INVENTOR.
JOHN WIMBERLEY,
BY
McMorrow, Berman & Davidson
ATTORNEYS.

May 21, 1963  J. WIMBERLEY  3,090,159
TREE AND STALK GIRDLER
Filed March 2, 1962
3 Sheets-Sheet 3
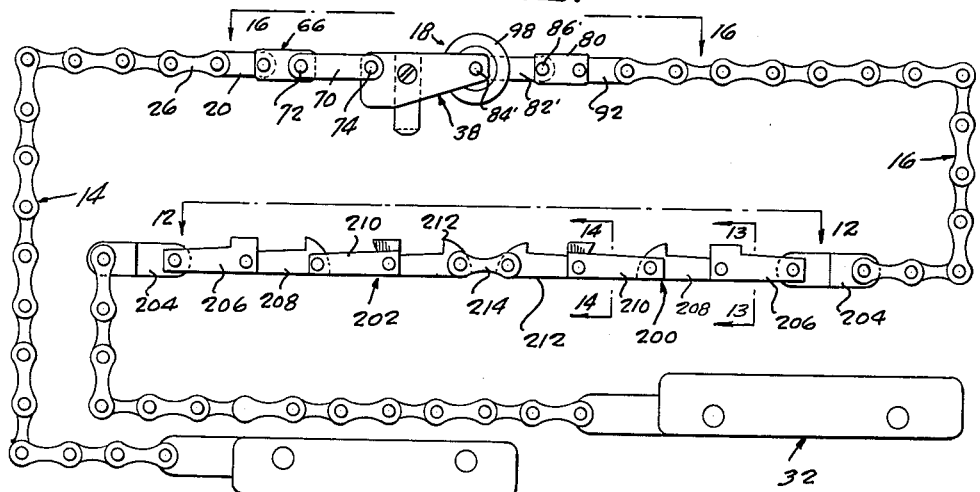
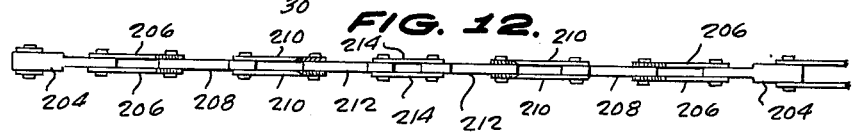
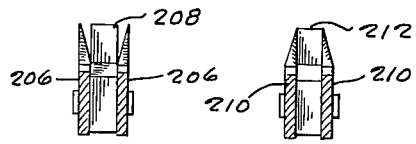
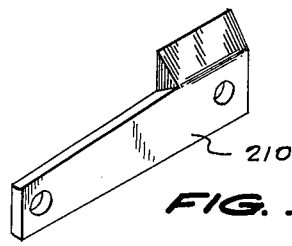
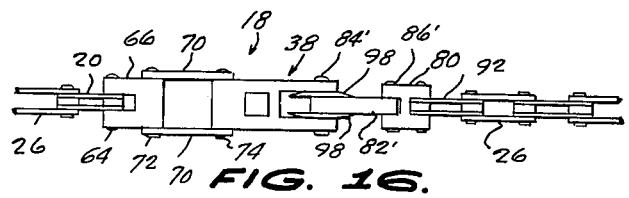
INVENTOR.
JOHN WIMBERLEY,
BY
McMorrow, Berman & Davidson
ATTORNEYS.

United States Patent Office 3,090,159
Patented May 21, 1963

3,090,159
TREE AND STALK GIRDLER
John Wimberley, Rte. 1, Box 154A, Terra Bella, Calif.
Filed Mar. 2, 1962, Ser. No. 177,092
11 Claims. (Cl. 47—1)

This application is a continuation-in-part of application Serial No. 72,524, filed November 29, 1960, now abandoned, and has to do with an invention releating to a girdler, especially, but not exclusively, for girdling grape vine stalks.

The primary object of the invention is the provision of a simpler, more efficient, and more easily operated girdler, which reduces the amount of time and labor ordinarily required.

Another object of the invention is the provision of a girdler of the character indicated above which comprises a cutting unit connected to and extending between two flexible chains, the chains being adapted to be trained around opposite sides of a vine stalk, with the cutting unit engaged with the back of the stalk, and the chains held in the hands and worked, so as to move the cutting unit around the stalk.

A further object of the invention is the provision of a girdler of the character indicated above, wherein one of the chains is shorter than the other, so that when the free ends of the chains are held even with each other, the cutting unit is disposed in a starting position, at one side of the stalk.

A still further object of the invention is the provision, in a girdler of the character indicated above, of a cutting unit which comprises a U-shaped loop cutter which operates in conjunction with two laterally-spaced rotary cutting discs which are operationally positioned in advance of the loop cutter, so that the discs cut parallel slits in the bark of a stalk, while serving as rollers on which the cutting unit travels around a stalk, and the loop cutter is guided to cut a relatively deep girdle groove in the underlying material of the stalk, the groove being at least as wide as the spacing of the discs.

Yet another object of the invention is the provision of a cutting unit of the character indicated above, wherein the loop cutter is reversible, to cut in either direction, and is adjustably mounted for cutting deep, medium depth, and shallow girdle grooves.

Other important objects and advantageous features of the invention will be apparent from the following description and the accompanying drawings, wherein, for purposes of illustration only, a specific form of the invention is set forth in detail.

FIGURE 4 is a fragmentary longitudinal section taken on the line 4—4 of FIGURE 2;

FIGURE 5 is an enlarged vertical transverse section taken on the line 5—5 of FIGURE 4;

FIGURE 6 is a schematic perspective view showing the girdler in operative position relative to a grape vine stalk, in conjunction with a wedge used to space the stalk from its associated supporting stake;

FIGURE 7 is a horizontal section taken on the line 7—7 of FIGURE 6;

FIGURE 8 is a view like FIGURE 7, on a reduced scale, showing the cutting unit positioned at the left-hand side of the back of the stalk, in starting position, wherein the longer right-hand chain is trained around the back of the stalk;

FIGURE 9 is a view like FIGURE 8, showing the cutting unit at the right-hand side of the back of the stalk, in a finishing position;

FIGURE 10 is a view like FIGURE 9, showing the girdler reverse on the stalk for girdling the opposite or front of the stalk;

FIGURE 11 is a contracted side elevation of another form of the girdler of the present invention;

FIGURE 12 is a plan view taken on the line 12—12 of FIGURE 11, illustrating the right and left-hand groups of knives and drags contained in one of the chains of the girdler of FIGURE 11;

FIGURE 13 is an enlarged fragmentary view taken on the line 13—13 showing the construction of one of the knives of the left-hand group of knives and drags in one of the chains of the girdler of FIGURE 11;

FIGURE 14 is an enlarged fragmentary view taken on the line 14—14 of FIGURE 11, showing the construction of a drag of the left-hand group of knives and drags in one of the chains of the girdler of FIGURE 11;

FIGURE 15 is an enlarged perspective view of another of the knives of the left-hand group of knives and drags in one of the chains of the girdler of FIGURE 11; and FIGURE 16 is a plan view taken on the line 16—16 of FIGURE 11, illustrating the cutting unit of the girdler of FIGURE 11.

Figure 2:
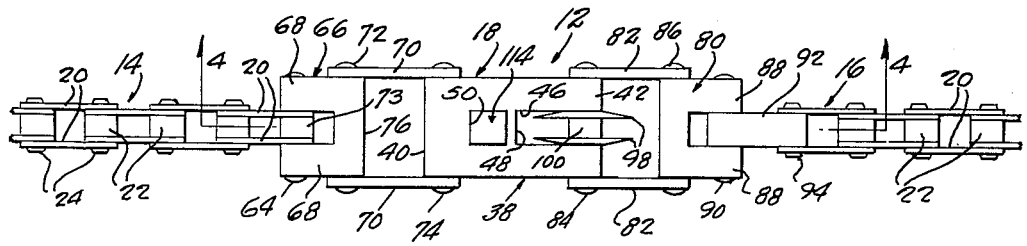
FIGURE 2 is a fragmentary top plan view of FIGURE 1.

Referring in detail to FIGURES 1 to 10 of the drawings, wherein like numerals designate like parts throughout the several views, the illustrated girdler, generally designated 12, comprises a first or relatively short chain 14, a second or relatively long chain 16, and a cutting unit 18 connected between the chains.

The chains are preferably composed of laterally-spaced and alternately overlapped links 20, with spacers 22 therebetween at their ends, the links and the spacers being traversed by pivot pins 24. The side edges of the links 20 are longitudinally concaved, as indicated at 26, to substantially conform in curvature to the generally cylindrical surfaces of grape vine stalks 28. Elongated rigid first and second handles 30 and 32, respectively, have laterally-offset lugs 34, on one end thereof, to which ends of the chains 14 and 16 are pivoted, as indicated at 36.

Figure 1:
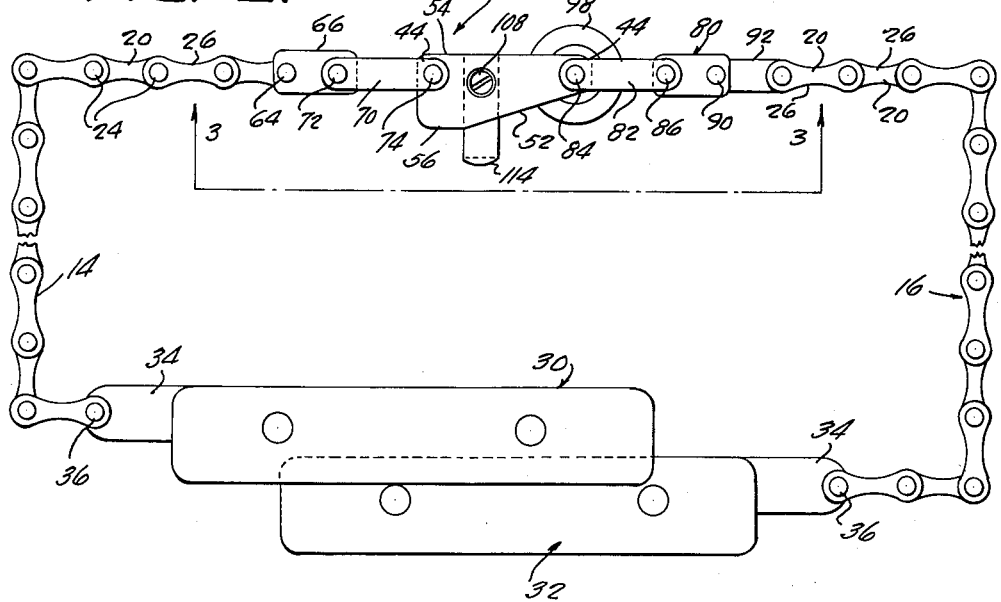
FIGURE 1 is a contracted side elevation of a girdler of the present invention.

The cutting unit 18 comprises a guide block 66 and 80 disposed on each side of the unit, with a bar link 70 and 82 extending from the guide blocks 66 and 80 to the unit 18 and having each of the ends pivotally connected to the guide blocks and the unit. Specifically, the cutting unit 18 comprises an elongated rectangular cutter block 38, of substantial thickness, the corners of whose first and second ends 40 and 42, are rounded, as indicated at 44. A centered longitudinal slot 46 extends from the middle of the block 38 and opens to the second end 42, and has a closed inward end 48. A centered rectangular opening 50 extends through the block 38 in line with and close to the inward end 48 of the slot 46. As shown in FIGURES 1 and 4, the block is of longitudinally-tapered cross-section or wedge-shaped, and has an inner surface which includes a second end portion 52 which is disposed at an acute angle to the flat outer curface 54 of the block, and a first end portion 56 which is parallel to the outer surface 54. The inner surface of the block is formed, through the first end portion 56 and part-way into the second end portion 52, with a downwardly-opening longitudinal groove 58 which opens to the first end 40 of the block. The bottom 60 of the groove 58 is parallel to the outer block surface 54, and the rectangular opening 50 opens thereto.

The first U-shaped guide block 66 has parallel legs 68 extending in a direction away from the ccutter block 38, and end links 20 of the first chain 14 are disposed between the legs 68, at their free ends, the legs and the links being traversed by a pivot pin 64. Elongated bar links 70, of substantial cross-section, are engaged, at their ends, with the side edges of the guide block and the cutter block 38, at related ends thereof, and pivot pins 72 and 74 extend through the bar links and respectively through the bight portion 76 of the guide block and the first end 40 of the cutter block 38. A spacer 73 is disposed in the pivot pin 64 between the chain links 20.

The second U-shaped guide block 80, similar to the first guide block 66, is similarly connected to the second end of the cutter block 38 by bar links 82 and pivot pins 84 and 86. The free ends of the legs 88 of the second guide block 80 are traversed by a pivot pin 90, which is journalled through the adjacent end of a solid chain link 92, which is disposed between and takes up the space between the legs 88. The other end of the solid link 92 is pivoted to the adjacent end of the second chain 16 by a pivot pin 94.

A pair of discs 98, separated by a spacer 100, are journalled on the pivot pin 84 within the cutter block slot 46. The discs are substantially larger in diameter than the smaller second end 42 of the cutter block 38, but the lower edges of the discs do not extend below the first end portion 56 of the inward surface of the block 38, as is shown in FIGURES 1 and 4. The laterally outward sides of the discs 98 are peripherally bevelled to define peripheral cutting edges 102.

As shown in FIGURE 5, transversely-aligned threaded bores 104 and 106 extend from the cutter block opening 50 to related sides of the block, and contain set screws 108 and 110, respectively, which have conical inner ends 112, the screw 108 being displaced downwardly from the screw 110. Removably engaged in the opening 50 is a loop cutter 114.

The loop cutter 114 comprises a solid rectangular block 116, fitting the opening 50 and of a depth corresponding to that of the part of the block 38 in the region of the opening 50. Extending away from the block 116 is a U-shaped loop or eye 118, which comprises relatively thin parallel spaced legs 120, which terminate at their ends remote from the block 116 in an arcuate bight portion 122. As shown in FIGURE 4, the bight portion 122 is double-bevelled to the inner surface 124 of the bight portion 122, so as to define similar cutting edges 126 and 128 at the opposite sides of the bight portion.

The block 116 of the loop cutter is formed in its laterally-outward sides with conical recesses 134 and 136. The recesses are aligned with each other crosswise of the block 116, but the recess 134 is downwardly and inwardly-displaced with respect to the recess 136. This arrangement of recesses and set screws is expressly provided so that the loop cutter 114 can be adjusted, relative to the cutter block 38, for depth of cut.

FIGURE 5 shows the cutter 114 positioned for a shallow depth cut, wherein the set screw 110 is engaged in the recess 132 and the set screw 108 is out of contact with the block 116. For a medium-depth cut, the set screw 110 is backed off and the cutter moved in the opening 50 to position its recess 134 to be engaged by the set screw 108. For a maximum-depth cut, the cutter 114 is removed from the opening 50, reversed, and re-engaged in the opening 50, so that its recess 136 can be engaged by the set screw 108. As is clear from FIGURE 4, the bight portion 122 of the loop cutter 114 is always spaced inwardly from the inward surface of the cutter block 38 and from the inward edges of the cutter discs.

Where a grape vine stalk 28 is too close to a supporting stake S, to permit of passing the chains 14 and 16 therebetween, I provide a wedge 140 which comprises an elongated rectangular cross-section wedge body 142, which has two opposed forwardly-converging sides 144 which meet in a vertical entering point 146. Suitably fixed on the longer outer end of the wedge body 142 is a vertical loop handle 148.

In operation, the girdler 12 is passed around the vine stalk 28, as shown in FIGURE 8, with the short or first chain 14 at the left-hand side of the stalk and with the long or second chain 16 at the right-hand side thereof, so that the cutting unit 18 occupies a starting position at the left-hand side of the back surface 150 of the stalk, and part of the right-hand chain 16 is trained around the back surface 150. Then, while the left-hand chain 14 is held in one hand, the right-hand chain 16 is pulled, with the other hand, in a direction away from the stalk and toward the left, as indicated by the arrow in FIGURE 9, so as to work the cutting unit 18 around the back surface 150 and form a girdle groove 152 therein. It is to be noted that as the part of the right-hand chain 16, engaged with the back surface 150 and preceding the cutting unit 18, is moved in contact with the surface, the chain 16 tears the bark 154 of the stalk, so that the work of the cutter discs 98 and the loop cutter 114 are facilitated. As a result of the foregoing operation of the girdler, the stalk 28 is formed with substantially half of a complete girdle groove 152. In order to form the remaining half of the complete girdle groove, the girdler 12 is reversed relative to the stalk, that is, the girdler is applied to the front or opposite side of the stalk, as shown in FIGURE 10, and is operated, in the same manner as before, starting in horizontal alignment with and at one end of the first half groove.

Figure 3:
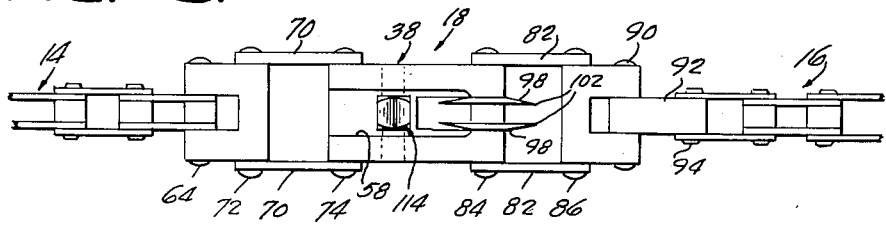
FIGURE 3 is a fragmentary bottom plan view of FIGURE 1, taken from the line 3—3.

Reverting to the form of the girdler of FIGURES 11 to 16, this girdler is the same as the girdler of FIGURES 1 to 10, inclusive, and differs over the latter girdler in that the chain 16 is provided with groups of right and left-hand knives and drags, and the cutting unit 18 has been modified so that the spaced bar links 82 of the form of FIGURES 1 to 3 have been replaced by a single bar link 82' which extends from the mid-point of the second guide block 80 to the mid-point of the cutter block 38 and between the cutter discs 98 and has its ends pivotally connected to the cutter block 38 and the guide block 80 by pivot pins 84' and 86' respectively. Specifically, the cutting unit 18 of the form of FIGURES 11 to 16 comprises the cutter block 38, guide blocks 66 and 80 disposed on opposite sides thereof, spaced bar links 70 extending from the guide block 66 to the cutter block 38 and having each of the complemental ends pivotally connected to the cutter block 38 and the guide block 66 by pivot pins 72 and 74, and the single bar link 82' extending from the mid-point of the guide block 80 to the mid-point of the cutter block 38 and between the cutter discs and having its ends pivotally connected to the cutter block and the guide block by the pivot pins 84' and 86'.

The groups of right and left-hand knives and drags provided in the chain 16 are indicated, generally, by the numerals 200 and 202, respectively, the numeral 200, FIGURE 11, indicating the left-hand group and the numeral 202 indicating the right-hand group. Since the structure of each group is identical except for the direction for the group to act in a left or right-hand manner, only one group will be specifically described.

The left-hand group, indicated by the numeral 200, comprises, FIGURE 11, a connector 204 pivotally connected to the chain 16, a first pair of knife-carrying bars 206 pivotally connected to said connector, a first drag 208 disposed behind and between said first pair of bars 206 and pivotally connected to said bars 206, a second pair of knife-carrying bars 210 disposed behind and embracing said drag 208 and pivotally connected to the drag 208, a second drag 212 disposed behind and between said second pair of bars 210 and pivotally connected to the bars 210 and a coupler 214 pivotally connected to the second drag 212.

These left and right-hand groups of knives and drags remove the dry bark ahead of the eyelet knife. They cut a half circle around a tree or vine, and when the operator moves to the other side of the tree or vine, this cuts the other half and completes the girdle. These knives stay clean and keep the eyelet knife from clog- 3,090,159

What is claimed is:

1. A girdler comprising a cutting unit, a guide block on each side of said unit, a bar link extending from each guide block to said unit and having each of its ends pivotally connected to said guide block and said unit, a chain on the side of each guide block remote from said unit and having one end connected to the adjacent guide block, and handles connected to the other ends of said chain.

2. A girdler comprising a cutting unit, a guide block on each side of said unit, spaced bar links extending from one of said guide blocks to said unit and having each of the adjacent ends pivotally connected to said guide block and said unit, a single bar link extending from the other of said guide blocks to said unit and having each of the ends pivotally connected to said guide block and said unit, a chain on the side of each guide block remote from said unit and having one end connected to the adjacent guide block, and handles connected to the other ends of said chain.

3. A girdler comprising a cutting unit, a guide block on each side of said unit, a bar link extending from each guide block to said unit and having each of its ends pivotally connected to said guide block and said unit, a chain on the side of each guide block remote from said unit and having one end connected to the adjacent guide block, one of said chains having groups of right and left-hand knives and drags, and handles connected to the other ends of said chain.

4. A girdler comprising a cutting unit, a guide block on each side of said unit, spaced bar links extending from each guide block to said unit and having each of the adjacent ends pivotally connected to said guide block and said unit, a chain on the side of each guide block remote from said unit and having one end connected to the adjacent guide block, and handles connected to the other ends of the chains.

5. A girdler comprising a cutting unit comprising a cutter block and having laterally-spaced rotary cutter discs and a loop cutter, said discs extending beyond one side of the block and said loop cutter extending beyond said one side and beyond the cutter discs, said cutter discs being positioned in advance of the loop cutter and the loop cutter being positioned between the cutter discs, a guide block on each side of said cutter block, spaced bar links extending from each guide block to said cutter block and having each of the adjacent ends pivotally connected to said guide block and said cutter block, a chain on the side of each guide block remote from said cutter block and having one end connected to the adjacent guide block, and a handle connected to the other end of each of said chains.

6. A girdler comprising a cutting unit, chains having first ends connected to the cutting unit, and handles connected to the other ends of the chains, said cutting unit comprising a cutter block and having laterally-spaced rotary cutter discs and a loop cutter, said discs extending beyond one side of the block and said loop cutter extending beyond said one side and beyond the cutter discs, said cutter discs being positioned in advance of the loop cutter and the loop cutter being positioned between the cutter discs, said loop cutter comprising a pair of laterally-spaced parallel legs and an edged bight portion, said loop cutter having a rectangular block from which said legs extend, said cutter block having a rectangular opening therethrough in which the loop block is removably engaged, and means for securing the loop cutter block in place.

7. A girdler comprising a cutting unit, chains having first ends connected to the cutting unit, and handles connected to the other ends of the chains, said cutting unit comprising a cutter block and having laterally-spaced rotary cutter discs and a loop cutter, said discs extending beyond one side of the block and said loop cutter extending beyond said one side and beyond the cutter discs, said cutter discs being positioned in advance of the loop cutter and the loop cutter being positioned between the cutter discs, said loop cutter comprising a pair of laterally-spaced parallel legs and an edged bight portion, said loop cutter having a rectangular block from which said legs extend, said cutter block having a rectangular opening therethrough in which the loop block is removably engaged, and means for securing the loop cutter block in place, said loop cutter being reversible in the cutter block opening, and said bight portion having cutting edges on its opposite sides.

8. A girdler comprising a cutting unit, chains having first ends connected to the cutting unit, and handles connected to the other ends of the chains, said cutting unit comprising a cutter block and having laterally-spaced rotary cutter discs and a loop cutter, said discs extending beyond one side of the block and said loop cutter extending beyond said one side and beyond the cutter discs, said cutter discs being positioned in advance of the loop cutter and the loop cutter being positioned between the cutter discs, said loop cutter comprising a pair of laterally-spaced parallel legs and an edged bight portion, said loop cutter having a rectangular block from which said legs extend, said cutter block having a rectangular opening therethrough in which the loop block is removably engaged, and means for securing the loop cutter block in place, said loop cutter being reversible in the cutter block opening, and said bight portion having cutting edges on its opposite sides, and means for securing the loop cutter in said opening.

9. A girdler comprising a cutting unit, chains having first ends connected to the cutting unit, and handles connected to the other ends of the chains, said cutting unit comprising a cutter block and having laterally-spaced rotary cutter discs and a loop cutter, said discs extending beyond one side of the block and said loop cutter extending beyond said one side and beyond the cutter discs, said cutter discs being positioned in advance of the loop cutter and the loop cutter being positioned between the cutter discs, said loop cutter comprising a pair of laterally-spaced parallel legs and an edged bight portion, said loop cutter having a rectangular block from which said legs extend, said cutter block having a rectangular opening therethrough in which the loop block is removably engaged, and means for securing the loop cutter block in place, said loop cutter being reversible in the cutter block opening, and said bight portion having cutting edges on its opposite sides, and means for securing the loop cutter in said opening, comprising means for selectively positioning the loop cutter inwardly of the cutter block.

10. A girdler comprising a cutting unit, chains having first ends connected to the cutting unit, and handles connected to the other ends of the chains, said cutting unit comprising a cutter block and having laterally-spaced rotary cutter discs and a loop cutter, said discs extending beyond one side of the block and said loop cutter extending beyond said one side and beyond the cutter discs, said cutter discs being positioned in advance of the loop cutter and the loop cutter being positioned between the cutter discs, said loop cutter comprising a pair of laterally-spaced parallel legs and an edged bight portion, said loop cutter having a rectangular block from which said legs extend, said cutter block having a rectangular opening therethrough in which the loop block is removably engaged, and means for securing the loop cutter block in place, said loop cutter being reversible in the cutter block opening, and said bight portion having cutting edges on its opposite sides, said cutter block having opposed sides formed with transversely-aligned threaded bores opening to opposite sides of said opening, set screws threaded in said bores, said loop block having opposed sides formed with transversely-aligned screw-receiving recesses, the bores at opposite sides of the cutter block being staggered relative to each other and the recesses at opposite sides of the loop block being staggered relative to each other, only one of the set screws being engageable in a recess at a time.

11. The girdler according to claim 2 which includes in addition groups of right and left-hand knives and drags on one of said chains.

References Cited in the file of this patent

UNITED STATES PATENTS

| | | |
|---|---|---|
| 631,153 | Clark | Aug. 15, 1899 |
| 2,855,724 | Graves | Oct. 14, 1958 |
| 3,030,986 | Longert | Apr. 24, 1962 |

FOREIGN PATENTS

| | | |
|---|---|---|
| 1,076,638 | France | Apr. 21, 1954 |
| 917,692 | Germany | Sept. 9, 1954 |
| 176,363 | Great Britain | May 25, 1922 |